3,449,225
ELECTROLYTIC PROCESSES FOR PREPARING
HALOGENATED ORGANIC COMPOUNDS
Edwin A. Matzner, St. Louis, Mo., assignor to Monsanto
Company, St. Louis, Mo., a corporation of Delaware
No Drawing. Continuation-in-part of application Ser. No.
389,767, Aug. 14, 1964. This application Feb. 1, 1966,
Ser. No. 523,946
Int. Cl. B01k 1/00
U.S. Cl. 204—81  19 Claims

ABSTRACT OF THE DISCLOSURE

An electrolytic process for preparing halogenated organic compounds from inorganic halides and organic compounds having preferentially-electro-positive-halogen-replaceable-hydrogen bonded to an atom selected from the group consisting of nitrogen and oxygen atoms in an aqueous medium.

---

This application is a continuation-in-part of copending application, Ser. No. 389,767, filed Aug. 14, 1964 and now abandoned which is a continuation-in-part of my prior application, Ser. No. 218,130, filed Aug. 20, 1962 and now abandoned.

The present invention relates to halogenated organic compounds and to novel processes for preparing such compounds. The present invention further relates to novel electrolytic processes for preparing organic compounds containing positive halogen. The present invention more particularly relates to novel electrolytic processes for preparing triazine compounds containing positive or available halogen.

It has been proposed heretofore in U.S. Patent No. 618,168 to Alexander Classen dated Jan. 24, 1908 to prepare tetra-iodo-phenolphthalein by subjecting an aqueous solution composed of 30 grams of phenolphthalein and 100 grams of water containing sodium hydroxide and a 50% solution of potassium iodide to electrolysis using a current of about 1.5 amperes and thereafter heating the electrolyzed liquid until the blue tint characterizing such liquid has changed to brownish yellow and tetra-iodo-phenolphthalein is thereafter precipitated with hydrochloric acid.

It has also been proposed heretofore in U.S. Patent 765,996 to Albrecht Schmidt and Rudolf Muller dated July 26, 1904 to prepare bromo-indigo by electrolysis of an aqueous or sulfuric acid suspension of indigo or indigo white treated with nitrogen bromide, sodium bromide or other bromates.

However, in the above-mentioned processes described by Classen and Schmidt et al. the halogen attaches to the carbon atom of an unsaturated carbon-carbon linkage and does not replace a hydrogen. Also in the processes described by the Classen and Schmidt et al. patents the halogen, e.g. either iodine or bromine, is initially in the electro-negative state and at the conclusion of the electrolysis the resulting halogenated compounds contain only electro-negative halogen.

It has further been proposed heretofore in U.S. Patent 2,282,683 to Miroslav Tamele et al. patented May 12, 1942 to electrolyze unsaturated alcohols and alkali metal halides by means of a direct electric current to prepare halohydrins (e.g. chlorohydrins). In the above-described three processes chlorine, bromine and/or iodine in the electro-negative state are incorporated in the molecules of the above-described unhalogenated compounds and after their incorporation therein remain in the electro-negative state.

In the processes taught by Tamele the chlorine does not replace a hydrogen atom but is added to a carbon atom in the chlorination saturation of unsaturated allyl alcohol.

The term "positive halogen" as used herein is intended to mean and include halogen atoms which have replaced hydrogen atoms in organic compounds in which the hydrogen was bonded to oxygen or nitrogen atoms. Such halogen is referred to as "positive" or "available" halogen and compounds containing such halogen usually hydrolyze, at least in part, in water to yield hypohalite ions.

It has been proposed heretofore to chemically halogenate certain classes of organic compounds to provide organic compounds containing positive halogen by a variety of procedures. Thus, for example, U.S. Patent 2,694,722, issued Nov. 16, 1954, discloses processes for preparing alkyl hypochlorites which consist of taking an inorganic hypochlorite salt such as sodium hypochlorite and an alcohol dissolved in water and then adding carbon dioxide. Alkyl hypochlorite is produced according to this patent in accordance with the chemical quotation

$$NaOCl + CO_2 + (CH_3)_3COH \rightarrow (CH_3)_3COCl + NaHCO_3$$

Also U.S. Patent 2,964,525, issued Dec. 13, 1960, to William L. Robinson and assigned to Monsanto Chemical Company discloses continuous processes for preparing dichlorocyanuric acid which comprise continuously introducing an aqueous solution or dispersion of dipotassium cyanurate and chlorine into a reaction zone and maintaining the pH in the reaction zone at not more than 4.5. This patent also discloses continuous processes for producing trichlorocyanuric acid which comprise continuously introducing an aqueous solution of trisodium cyanurate and chlorine into a reaction zone maintained at a pH below 4.5.

Processes for preparing sodium and potassium salts of dichlorocyanuric acid have been disclosed in U.S. Patent 3,035,056, issued May 15, 1962 to William F. Symes and assigned to Monsanto Chemical Company. These processes involve bringing together and reacting chlorine and trisodium or tripotassium cyanurate in an aqueous medium in which the chlorine is added and mixed at a rate such as to maintain the pH of the reaction mixture in the range of about 6.0 to 8.5. When trisodium cyanurate is chlorinated in accordance with the above process sodium dichlorocyanurate is produced; when tripotassium cyanurate is so chlorinated, potassium dichlorocyanurate is produced.

The above described processes for chlorinating organic compounds have certain disadvantages in that by-products such as sodium bicarbonate or sodium or potassium chloride are formed along with the chlorinated organic compounds. In these processes it is usually necessary to separate such by-products from the chlorinated organic compounds and such separation is often time consuming and expensive. Also when cyanurates are chlorinated following the processes described in the aforementioned Robinson and Symes patents, gaseous chlorine is consumed in the formation of sodium or potassium chlorides as well as in forming the chlorocyanurates. Also the gaseous chlorine employed is quite expensive and is somewhat difficult to handle. However, in accordance with the processes of the present invention, relatively inexpensive inorganic halides are employed and substantially stoichiometric amounts of halogen atoms from halides are consumed in the halogenation of organic compounds. Substantial raw material savings are thereby achieved.

The novel processes of halogenating organic compounds of the present invention to provide the electropositive halogenated organic compounds was disclosed in part in U.S. patent application Ser. No. 218,130 filed in the United States Patent Office on Aug. 20, 1962 and now abandoned. The present invention was also fully disclosed in U.S. patent application Ser. No. 389,767 filed in the United States Patent Office on Aug. 14, 1964, said patent application Ser. No. 389,767 being a continuation-in-part of U.S. patent application Ser. No. 218,130. The disclosure contained in the present application should be taken in conjunction with said application Ser. No. 218,130 and application Ser. No. 389,767, and considered as a continuation of said application 389,767.

It is an object of the present invention to provide halogenated organic compounds, particularly halogenated compounds containing positive halogen.

It is a further object of this invention to provide novel economical processes for preparing chlorinated compounds containing positive chlorine which overcome certain difficulties and disadvantages inherent in the prior art processes.

It is a further object of this invention to provide novel electrolytic processes for economically preparing halogenated organic compounds containing positive halogen in which the halogen from inexpensive halides is employed to stoichiometrically replace hydrogen bonded to oxygen and/or nitrogen atoms.

Still further objects and advantages of the present invention will become apparent from the following description and the appended claims.

The objects of this invention are attained in general by a process which comprises passing an electric current through an aqueous medium maintained at a temperature of from just above the freezing point to about 80° C. and a pH in the range of from about 1 to about 12 and comprising (1) water, (2) an inorganic halide, and (3) an organic compound having replaceable hydrogen bonded to oxygen or nitrogen atoms. Such organic compound preferably has preferentially-electro-positive-halogen-replaceable-hydrogen bonded to the oxygen or nitrogen atoms. By so proceeding an organic compound containing positive halogen, which is bound to an oxygen or a nitrogen atom, is formed in the aqueous medium. The halogenated organic compound so formed, which contains halogen in the electro-positive state, may then be separated from the aqueous medium by a variety of methods well known to those skilled in the art such as for example by extraction, precipitation, concentration and the like. The electric current may be advantageously passed through the aqueous medium in for example an electrolysis cell equipped with electrically conductive elements such as electrodes which are in contact with the aqueous medium and which are connected to a suitable electric current source. When desired, the aqueous medium may be placed in or pumped through the electrolysis cell.

The term "preferentially-electro-positive-halogen-replaceable-hydrogen" as used herein is intended to mean and to refer to hydrogen atoms which are bonded to nitrogen and oxygen atoms in certain organic compounds and which will, when in an aqueous medium containing an inorganic halide and through which an electric current is passed, be replaced by the halogen of the inorganic halide. This halogen as it replaces the aforedefined replaceable hydrogen is converted from the electro-negative state to the electro-positive state.

In accordance with the present process it has been found possible to halogenate a wide variety of classes of organic compounds in which hydrogen, having the properties above defined, is bonded to oxygen or nitrogen atoms. During halogenation hydrogen gas is usually evolved from the medium. Classes of organic compounds which may be halogenated in accordance with the processes of this invention include straight and branched chain aliphatic compounds, cyclic and heterocyclic compounds for example aromatic and aliphatic alcohols, primary and secondary alkyl, aryl, alkaryl, and aralkyl amines, amides, imides, imines and heterocyclic compounds containing oxygen or nitrogen atoms to which hydrogen is bonded. Particularly preferred compounds which may be halogenated in accordance with the processes of this invention are further characterized in that their molecules are usually free of carbon to carbon unsaturation.

Examples of alcohols which may be halogenated include primary and secondary aliphatic monohydric, dihydric, polyhydric and certain aralkyl alcohols. Examples of primary and secondary aliphatic monohydric alcohols include saturated aliphatic alcohols for example methyl, ethyl, n-propyl, isopropyl, n-butyl, iso-butyl, sec-butyl, t-butyl, n-amyl, iso-amyl, t-amyl, n-hexyl, n-octyl, capryl, n-decyl, lauryl, myristyl, cetyl and stearyl alcohols; examples of saturated dihydric alcohols include ethylene glycol, propane diol, butane diol, pentane diol and the like; examples of trihydric and polyhydric saturated aliphatic alcohols include glycerol, sorbitol, manitol and the like; examples of cyclic alcohols include mono-, di-, and polyhydric alcohols of cyclo-alkanes including the alcohols of cyclo-propane, cyclo-butane, cyclo-pentane and cyclo-hexane in which the alcohols of the cyclo-alkane may have 1, 2 or more hydroxyl groups; examples of aralkyl alcohols which may sometimes include alcohols having some carbon-carbon unsaturation include benzyl, beta-xylyl-ethyl, beta-tolyl-propyl, mesityl alcohols and the like. When the above compounds are halogenated in accordance with the processes of the present invention one or more hydrogen atoms attached to OH groups of the alcohol molecule are replaced with electro-positive chlorine.

Examples of amines which may be halogenated include primary and secondary aliphatic and aryl mono-, di-, tri-, and tetra-amines. Specific examples of primary and secondary aliphatic mono-amines include methylamine, dimethylamine, ethylamine, diethylamine, triethylamine, n-propylamine, di-n-propylamine, n-butylamine, n-amylamine, n-hexylamine, laurylamine, etc.; examples of aliphatic diamines include ethylene diamine, trimethylene diamine, tetramethylene diamine, pentamethylene diamine, hexamethylene diamine and the like as well as the corresponding triamines. Other amines which may be halogenated include cyclic and straight chain alcohol amines for example mono-ethanolamine, di-ethanolamine, monopropanolamine, dipropanolamine, monobutanolamine, dibutanolamine, etc.; examples of cyclic amines which may be halogenated include cycloalkane amines for example cyclo-propyl amine, cyclo-butyl amine, cyclo-pentyl amine, cyclo-hexyl amine and the like; examples of aralkyl amines which may be halogenated include phenyl, nitrophenyl, benzyl, alkyl benzyl amines and the like.

Examples of amides which may be halogenated include aliphatic and aromatic amides for example alkyl and aralkyl carboxylic acid amides including acetamide, proprionamide, butyramide, iso-valeramide, caproic amide, capryl amide, capric amide, lauric amide, myristic amide, palmitic amide, stearic amide, etc. Other amides which may be halogenated include sulfonic acid amides for example methyl, ethyl, butyl, etc., sulfonamides and aromatic or aralkyl amides including benzamide, n-methyl benzamide, benzene sulfonamide, toluene sulfonamide and the like.

Examples of imides which may be halogenated include malonimide, succinimide, phthalimide, naphthalimide, N-acetyl benzamide and the like. Examples of imines include trimethylenimine, guanidine, cyclohexanimine, benz-pyrrolidine and the like.

Heterocyclic compounds having hydrogen bonded to oxygen or nitrogen atoms which may be halogenated in accordance with the processes of this invention include compounds having in one tautomeric form the following general formula:

where X is

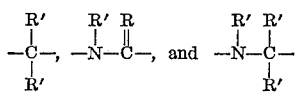

where R is oxygen or NH and R' is hydrogen or an alkyl radical. Examples of compounds falling within the scope of the above general formula include cyanuric acid and metal salts thereof, ammeline, ammelide, melamine, alkyl guanamines such as ethyl and butyl guanamine, hydantoins including alpha-methyl hydantoin and alpha-dimethyl hydantoin and the like.

From the foregoing it will be seen that a preferred class of organic compounds which may be halogenated in accordance with the processes of this invention include organic nitrogen containing compounds such as amines, amides and cyclic and heterocyclic nitrogen containing compounds having at least one preferentially-electro-positive-halogen-replaceable-hydrogen bonded to a nitrogen in said compound.

Although organic compounds composed of molecules which are free of carbon-carbon unsaturation are particularly preferred, organic compounds having carbon-nitrogen unsaturation will usually be halogenated. Also the hydrogen bonded to the oxygen in aromatic alcohols such as catechol or phenol (e.g. having less than three carbon-carbon unsaturation sites) may be replaced with an electro-positive halogen atom in accordance with the processes of this invention.

It has been found possible in accordance with the process of this invention to pass an electric current through an aqueous medium maintained at a temperature and pH within the hereinbefore described ranges and comprising water, an inorganic halide and any of the above classes of compounds, e.g. alcohols, amines, amides, imides, imines and heterocyclic compounds containing hydrogen bonded to oxygen or nitrogen atoms to form the corresponding halogenated compounds, e.g. organic O-halogenated hypohalides, N-halogenated amines, amides, imides, imines, and the above described heterocyclic compounds. Halogenated organic compounds containing positive halogen atoms such as chlorine, bromine, iodine and fluorine bonded to oxygen or nitrogen atoms may be prepared in accordance with the processes of this invention. However, organic compounds containing positive iodine and fluorine tend to be more unstable than corresponding compounds containing positive chlorine or bromine and it has been found generally advantageous, for the most part, to prepare organic compounds containing positive chlorine and/or bromine.

The temperature of the aqueous medium may vary, as noted above, in the range of from about just above the freezing point of the medium to about 80° C., depending, in part, on factors such as the organic compound employed, the solubility and concentration of the ingredients in the aqueous medium and the electrical conductivity of the medium. When the temperature of the aqueous medium falls or is permitted to fall to or below the freezing point of the medium, little, if any, halogenated organic compound will be formed because substantial resistance to the passage of electric current through the medium develops at such temperatures and the process reactants may become insoluble. On the other hand, if the temperature of the aqueous medium rises or is permitted to rise above about 80° C. substantial undesirable side reactions, including product decomposition often occur resulting in lower product yield. The pH of the aqueous medium may vary from about 1.0 to about 12.0 and as is hereinafter evident will depend upon the inherent acidity of the organic compound to be halogenated, the halogenated organic compound to be prepared, and other factors. Thus when it is desired to halogenate an alcohol to form an organic hypohalite, it is preferred to maintain the aqueous medium at a temperature of from about −5° C. to about 40° C. and a pH of from about 4 to about 10. When it is desired to halogenate compounds such as organic amines, amides, and heterocyclic compounds, the aqueous medium is preferably maintained at a temperature in the range of from just above the freezing point to about 80° C., more preferably from about −5° C. to about 60° C., and a pH of from about 4 to about 10 depending upon the particular organic compound to be halogenated. When it is desired to prepare a halo cyanuric acid such as for example a chlorocyanuric acid, the aqueous medium is preferably maintained at a temperature of from just above the freezing point to about 60° C. and a pH in the range of from about 1 to about 5, preferably a pH of from about 2 to about 4.5. When it is desired to prepare a metal dihalo cyanurate such as a metal dichlorocyanurate, the aqueous medium is preferably maintained at a temperature of from just above the freezing point to about 80° C., preferably from about 5° C. to about 50° C., and at a pH of from about 5 to about 12, preferably from about 5.5 to 8.5.

In carrying out the present process, the concentration of an organic compound in the aqueous medium may vary considerably and will generally depend upon whether the compound is alkaline, neutral or acidic, the solubility of the compound, the effect of the compound on the electrical resistance of the medium and the amount of hydrogen in the compound to be replaced by halogen atoms. Thus, by way of example, many organic acidic compounds when present in high concentration may cause some difficulty in maintaining the pH within the lower limit of the pH range. Also certain amines are highly alkaline and when present in high concenerations may cause some difficulty in maintaining the pH of the medium within the upper limits of the pH range. Also, by way of example, if the compound is an alcohol or is a compound which is only sparingly soluble and is present in the form of a slurry, the aqueous medium tends to be resistant to the flow of electric current therethrough. Generally speaking, the concentration of organic compound in the medium is advantageously within the range of from about 0.05% to about 60%, more desirably from about 0.1% to about 50%, by weight of the aqueous medium. Variation within this range will, in general, depend upon the factors above-described.

The inorganic halide employed in the processes of this invention may be a metal halide, preferably a water soluble metal chloride or bromide, a hydrohalide preferably hydrochloric or hydrobromic acid, or a mixture of a metal halide and a hydrohalide. In many instances it is preferred that the inorganic halide be a mixture of a water soluble metal halide and a hydrohalide since, as previously noted, many of the organic compounds which may be employed in the aqueous medium tend to cause the aqueous medium to be resistant to the flow of electrical current therethrough, thus requiring considerable consumption of electric power, if a metal halide is not used.

By way of example, if a soluble electrically conductive organic compound such as, for example, an amine or a metal cyanurate is present in the aqueous medium the inorganic halide may be a hydrohalide per se and the hydrohalide will provide halogen and also maintain the pH within the desired range. On the other hand, also by way of example, it is possible to prepare certain halogenated compounds such as salts of dichlorocyanuric acid in which the equeous medium will contain cyanuric acid and a metal halide per se. When a metal halide per se is employed the pH of the medium may be controlled by relatively non-electrically conductive acids such as acetic and oxalic acids. However, the use of such acids always results in greater power consumption per unit yield of product. It has been found preferable to employ an inorganic halide comprising a mixture of a metal halide and a hydrohalide having the same halogen atom. When desired, mixtures of halides (e.g. bromides and chlorides) may be employed and under such conditions mixtures of brominated and chlorinated organic compounds, and organic compounds containing both chlorine and bromine atoms, are often formed. Generally speaking, an inorganic halide comprising a mixture of a water soluble metal halide and a hydrohalide having a common halogen will provide an electrically conductive aqueous medium through which an electrical current will readily flow and the halogenation of the above described organic compounds may be readily accomplished, and pure homogeneous halogenated organic compounds are obtained.

The amount of inorganic halide employed is at least an amount sufficient to provide halogen atoms for the halogenation of the organic compound and, when process conditions so require, to lower the electrical resistance of the aqueous medium, thus facilitating the flow of electric current therethrough. Generally speaking the use of one molecule of inorganic halide will provide sufficient halogen to replace 1 atom of hydrogen bonded to a nitrogen or oxygen atom in the compound to be halogenated. If incomplete halogenation is desired, less than such amount of halide may be used. On the other hand, if complete halogenation is required such amount or greater amounts can be used. Ordinarily it is desired to use an excess of such halide to facilitate the flow of electric current through the aqueous medium. Usually, from about 0.1% to about 30% of inorganic halide, based on the weight of the aqueous medium, is advantageously employed. When the inorganic halide is a water soluble metal halide a concentration of from about 0.1% to about 30% by weight is usually employed; the upper limit being restricted only by the solubility of the metal halide in the aqueous medium. When the inorganic halide is a hydrohalide from about 0.1% to about 11% by weight of hydrohalide is usually employed. If less than 0.1% of inorganic halide is used the aqueous medium will usually not contain enough halogen to halogenate the organic compound. When more than 11% of hydrohalide is used the pH of the medium will generally fall below the range in which the halogenation of the organic compound will take place.

When the inorganic halide employed comprises a mixture of a metal halide and a hydrohalide the amount of hydrohalide is sometimes sufficient to provide the halogen for halogenation of the organic compound and, except as noted hereinafter, the metal halide is usually employed to lower the electrical resistance of the aqueous medium. Advantageous concentrations of the mixture of inorganic halide have been found to be from about 0.1% to about 30% by weight of the aqueous medium. It has also been found possible to substitute a metal salt other than a metal halide such as a metal acetate or carbonate for the metal halide in the aqueous medium. However, under such circumstances, lower yields of halogenated organic compounds are usually obtained.

Examples of hydrohalides which may be employed as inorganic halides in the processes of this invention include HCl, HBr, HI and HF. However, HCl and/or HBr are preferred. Examples of metal halides include alkali metal and alkaline earth metal chlorides, bromides, iodides and fluorides and metal chlorides and bromides are particularly preferred. Other metal halides include nickel, copper, magnesium, cesium and zinc halides. Examples of mixtures of hydrohalides and metal halides which have been found generally advantageous include KBr-HBr, NaBr-HBr, KCl-HCl, NaCl-HCl, $CaCl_2$-HCl, $ZnCl_2$-HCl, NaCl-HCl, $CuCl_2$-HCl, $MgCl_2$-HCl, CsCl-HCl, etc., among others.

As previously indicated herein, the electric current employed in the processes of this invention can be passed through the aqueous medium by means of electrically conductive elements (e.g. electrodes) which are immersed in the aqueous medium and connected to a source of electricity. Although an alternating current may be employed, the electric current is preferably a direct electric current or a cyclic direct electric current such as, for example, a mixed direct and alternating current, or a pulsating direct electric current. A "mixed direct and alternating current" is a direct current having an alternating current superimposed thereon which is in effect a direct electric current which varies cyclically. Stated differently it is a current having rapid succession of repetitive high and low amperage in which the overall direction of the current is unidirectional. A pulsating direct electric current is a current having repetitive pulses of uni-directional current and is obtained by the ordinary rectification of alternating current. When such current is "filtered" a cyclical direct electric current is produced which is similar or identical in character to that of a direct electric current having an alternating current superimposed thereon. Such cyclical uni-directional electrical currents are herein referred to as rippled electric currents and as will be hereinafter evident are particularly advantageous when certain kinds of electrodes are employed. Rippled currents which are preferred for use in the process of the present invention are characterized in having cyclical frequencies in the range of from about 1 to 240, more preferably in the range of from about 30 to 100, cycles per second.

Generally the amount of electric current used will be sufficient to effect the replacement with halogen atom of hydrogen, which is bonded to oxygen or nitrogen atoms in the organic compounds with halogen atoms. The amount of electric current is usually limited by factors such as the power source employed, the size of the electrolysis cell, and size of the electrodes used. The intensity of the current, expressed in terms of current density in the medium may suitably be in the range of from about 1 to about 4,000, preferably from about 50 to 2,000, amperes per square foot of electrode surface. Under such conditions the voltage required will vary depending on the electrical resistance of the aqueous medium. Generally the voltage required may vary from about 1.5 to 30, preferably from about 1 to about 12, volts between adjacent electrodes.

The electrolysis cell employed in the processes of this invention may be a commercially available or a custom built electrolysis cell and these cells may have volumes ranging from about 0.1 to 250,000 liters. Almost any electrically conductive material may be employed as electrodes in such cells. Examples of electrode materials which have been found particularly advantageous include commercially available graphite, platinum, titanium, tantalum, palladium, iridium, rhodium and osmium electrodes. However, when the electrodes are used with a nonpulsating direct current a film or concentration of certain reaction components in the electrolyte tends to envelope the electrodes resulting in "over voltage," and electrical power loss and lower product yield per unit of electric power consumed. Such over voltage can be overcome by the use of the previously described rippled electric current which tends to depolarize the electrodes and prevents the envelopment of electrodes by the reaction components present.

Examples of electrodes which may be employed with nonpulsating direct electric current include commercially available platinized titanium, platinized tantalum, or platinized platinum electrodes which contain, at least on the surface of the electrodes, a deposit of platinum on titanium or platinum on tantalum or platinum on platinum. When such electrodes are employed over voltage at the electrodes is minimized or does not occur.

A particularly advantageous electrolysis cell which may be employed in the practice of the processes of this invention is a bi-polar electrolytic cell containing a multiplicity of closely spaced platinized titanium or platinized tantalum electrodes having a potential of from about 1 to 12 volts between adjacent electrode surfaces. Under these conditions the current is passed through the aqueous medium which is pumped between the electrodes and it is possible to obtain product yields up to 100% of the yields theoretically possible based on the organic compound employed.

In carrying out the processes of this invention the formation of the halogenated compound is often accompanied by the production of heat. In some instances, the amount of heat is small enough to be dissipated during normal operations. In other instances, the amount of heat produced is usually greater when higher intensities of electric current and/or larger quantities (i.e. concentrations) of unhalogenated organic compounds are employed. Under such circumstances the heat or exotherm can sometimes be controlled by controlling the electric current and/or the amount of organic compound used. It has also been found possible to dissipate the heat formed by repeatedly pumping, e.g. cycling, the aqueous medium from the cell to cool it and then returning it through the electrolysis cell or by cooling the outside of the electrolysis cell usually by placing the cooling jacket around the cell.

It has presently been found possible to prepare an N-halogenated cyanurate by a process which comprises passing an electric current between at least one pair of electrodes through an aqueous medium maintained at a temperature in the range of from just above the freezing point to about 80° C. and a pH in the range of from about 1 to about 12 and comprising water, an inorganic halide and a cyanurate to form an N-halogenated cyanurate in the aqueous medium. Examples of N-halogenated cyanurates which can be prepared in accordance with the above process include dihalocyanuric acid, trihalocyanuric acid and metal salts of dihalocyanuric acid. The processes of this invention have been found especially advantageous in the preparation of N-chlorinated cyanurates.

The cyanurate employed in the above process may be cyanuric acid or a metal cyanurate. The amount of cyanurate may be varied as desired but, as noted hereinbefore, is advantageously from about 0.05% to about 60%, preferably from about 0.1 to about 50% by weight of the aqueous medium.

The inorganic halide employed will depend upon the particular cyanurate employed and the halocyanurate which it is desired to prepare. Thus, for example, when it is desired to prepare a chlorocyanuric acid from a metal cyanurate and an inorganic halide, the inorganic halide used will be hydrochloric acid or a mixture of hydrochloric acid and a small amount of metal chloride. On the other hand, when cyanuric acid is employed instead of the metal cyanurate the inorganic halide used will be a mixture of a metal chloride and hydrochloric acid, the latter being employed in an amount sufficient to maintain the pH within the appropriate range.

In an embodiment of one of the processes of this invention it has been found possible to prepare a chlorocyanuric acid by a process which comprises passing an electric current having an intensity as hereinbefore described, through an aqueous medium at a temperature within the range previously described and at a pH in the range of from about 2 to about 5 and consisting essentially of water, from about 0.1% to about 30% by weight based on the weight of the aqueous medium of a mixture of hydrochloric acid and a metal chloride preferably an alkali metal chloride and from about 0.05%, to about 60% by weight, based on the weight of the aqueous medium of cyanuric acid. The hydrochloric acid-metal chloride in the aqueous medium is most advantageously a mixture consisting of from about 10% to about 25% by weight, based on the weight of the aqueous medium of sodium chloride and hydrochloric acid, the amount of hydrochloric acid being sufficient to provide a mol ratio of hydrochloric acid to cyanuric acid of from about 1.9:1 to about 3.2:1. It is not known with certainty how the chlorination proceeds but the inorganic halide will usually provide at least a partial source of chlorine atoms for the chlorination of the cyanuric acid as well as providing an aqueous medium having suitable electrical conductivity. The hydrochloric acid also usually provides a source of chlorine atoms for the chlorination of the cyanuric acid and also serves to maintain the pH of the medium within the ranges above described. While any electrolysis cell and electrode materials may be employed, a bi-polar electrolysis cell having platinized titanium electrodes has been found to be particularly advantageous in preparing chlorocyanuric acids and metal salts of dichlorocyanuric acid.

When it is desired to prepare dichlorocyanuric acid it has been found desirable to employ the above described process except that the amount of hydrochloric acid in the hydrochloric acid-metal chloride mixture is preferably sufficient to provide a mol ratio of hydrochloric acid to cyanuric acid of from about 1.8:1 to about 2.2:1. When it is desired to prepare a trichlorocyanuric acid the amount of hydrochloric acid employed is preferably such as to provide a mol ratio of hydrochloric acid to cyanuric acid of from about 2.8:1 to 3.2:1. When the mol ratio of hydrochloric acid to cyanuric acid is in the range of about 2.2:1 to about 2.8:1 a mixture of dichloro- and trichlorocyanuric acids will usually be formed.

In another embodiment of this invention, metal dichlorocyanurates may be prepared by a process which comprises passing an electric current through an aqueous medium maintained at a temperature within the ranges previously described and at a pH in the range of from about 5 to about 12, preferably from about 5.5 to about 8.5, and comprising water, from about 0.1% to about 30% by weight, based on the weight of the aqueous medium of a mixture of a metal chloride and hydrochloric acid and from about 0.05% to about 60% by weight, preferably from about 0.1% to about 25% by weight, of cyanuric acid. The metal chloride will provide metal ions which provide the metal for the metal dihalocyanurate and the amount of hydrochloric acid used is preferably sufficient to provide a mol ratio of hydrochloric acid to cyanuric acid of from about 0.8:1 to about 1.2:1. This amount of hydrochloric acid is also sufficient to maintain the pH within the afore-described range. If less hydrochloric acid than the specified amount is employed a reaction mixture containing significant quantities of metal cyanurate as well as metal dichlorocyanurate will be formed and the pH of the aqueous medium will often rise above pH 12. If more than the specified amount of hydrochloric acid is employed, a reaction mixture containing significant quantities of chlorocyanuric acid as well as metal dichlorocyanurate will be formed and the pH of aqueous medium will often fall below pH 5.

When it is desired to prepare alkaline earth metal dichlorocyanurates the inorganic halide will consist of a mixture of an alkaline earth metal chloride and hydrochloric acid. Thus, for example, it has been found possible to prepare calcium di(dichlorocyanurate) by the above process in which the inorganic halide employed is a mixture of calcium chloride and hydrochloric acid.

When it is desired to prepare alkali metal dichlorocyanurates the inorganic halide employed preferably consists essentially of a mixture of an alkali metal chloride and hydrochloric acid. By way of example, potassium dichlorocyanurate may be readily prepared in accordance with the above process by employing a mixture of potassium chloride and hydrochloric acid in amounts within the ranges previously described.

In processes of this invention it is possible to pass the electric current through an aqueous medium in an electrolysis cell in a number of ways. For example, the aqueous medium may be charged to an electrolysis cell prior to or simultaneously with the passage of electric current therethrough. Also, the electric current may be passed through the aqueous medium in such a manner as to provide a batch or continuous process. Although the aqueous medium may be premixed and charged to an electrolysis cell, it has been found advantageous, particularly when the process is to be operated continuously, to simultaneously charge components of the aqueous medium in the form of aqueous slurries or dispersions of separate components to provide an aqueous medium of the character hereinbefore described. Thus, for example, an aqueous solution or dispersion of the organic compound and an aqueous solution or dispersion of the inorganic halide may be separately and simultaneously introduced into the electrolysis cell while passing the electric current through the cell. Also, when the inorganic halide is a mixture of metal halide and hydrohalide it has sometimes been found advantageous to separately and simultaneously introduce an aqueous dispersion or solution containing an organic compound and a metal halide and an aqueous solution containing the hydrohalide into the electrolysis cell.

When the components of the aqueous medium are combined as the medium is introduced into the electrolysis cell it is preferable to provide agitation or pumping means to insure intimate diffusion of the liquids charged. As the aqueous medium is continuously charged to the electrolysis cell the organic compounds containing positive halogen are almost immediately and continuously formed in and usually separate from the aqueous medium. In some instances such as when the halogenated organic compound formed is a liquid at room temperature the liquid usually rises to the top of the aqueous medium from which it can be removed either continuously or discontinuously by decantation. In other instances, and as is more often the case, the halogenated organic compounds form as solid insoluble particulates dispersed in the aqueous phase of the medium. Under these circumstances it has been found advantageous to remove the aqueous slurry from the electrolysis cell and to thereafter separate the solids from the bulk of the aqueous phase of the slurry so removed. In a continuous process where the aqueous medium is continuously charged to the electrolysis cell and an aqueous slurry containing the solid halogenated organic compound is continuously formed it has been found desirable to continuously remove a portion of the aqueous slurry in a volume and at a rate substantially the same as the rate at which the aqueous medium is charged.

Thus it has been found advantageous to prepare potassium dichlorocyanurate by a continuous process which comprises continuously contacting at least one pair of electrodes with an aqueous medium comprising water from about 0.1% to about 50% by weight of cyanuric acid and from about 5% to about 35%, preferably from about 5% to about 25% by weight of potassium chloride. While continuously passing a direct electric current through the aqueous medium between the electrodes sufficient hydrochloric acid is added to the medium to maintain a pH in the range of from about 5.5 to about 8.5 in the medium which is also continuously maintained at a temperature in the range of from about 0° C. to about 40° C. By so proceeding solid potassium dichlorocyanurate forms as a slurry in the medium from which it can be readily separated from the aqueous phase thereof. The amount of cyanuric acid is usually sufficient to provide an HCl to cyanuric acid mol ratio of from about 0.8:1 to about 1.2:1.

In the above process it is preferred to contact the electrodes with the aqueous medium by continuously introducing the aqueous medium into a bi-polar electric cell containing multiple electrodes (e.g. from 3 to 100 or more electrodes). The electrodes are usually metallic electrodes such as platinum, titanium, rhodium, etc., and are more preferably platinized platinum, platinized titanium or platinized rhodium. A direct electric current having a density of from about 100 to about 2000 amperes per square foot of electrode surface and a potential of from about 1.5 to about 300 volts is continuously passed between the electrodes through the aqueous medium in the cell. By so preceeding an aqueous slurry containing potassium dichlorocyanurate dispersed in the aqueous phase of the medium is continusly formed and a portion of the slurry is continuously removed. A hydrate of potassium dichlorocyanurate is formed in the aqueous slurry in high yields of 90 to 100% of those theoretically obtainable based on the cyanuric acid charged. Such hydrate can readily be recovered from the aqueous medium by methods such as centrifugation, sedimentation, decantation and the like.

In the chlorination of cyanuric acid it has been found particularly desirable to introduce or charge the aqueous medium or the components thereof into a reaction vessel and to continuously pass or cycle the aqueous medium through an electrolytic cell through which current is passed as previously described. In this way the current is successively passed through portions of the aqueous medium, and the heat is dissipated. By employing a separate reaction vessel, the pH of the medium can be continuously monitored throughout the process and the temperature can be more easily controlled.

The halogenated compounds which have nitrogen acid oxygen atoms which are both attached to the same carbon atom prepared by the processes of this invention can theoretically exist in either the enol or in the keto (iso) form and it is not known with certainly whether these compounds exist in the keto (or iso) forms or as mixtures of these two forms. The term "halocyanurate" as used herein is thus intended to refer to compounds in the enol, the keto (iso) form or as mixtures of these two forms.

A further understanding of the processes of the present invention will be obtained from the following specific examples which are intended to illustrate the invention, but not to limit the scope thereof, parts and percentages being by weight unless otherwise specified.

Example 1.—The preparation of N-propyl hypochlorite

Five parallel connected pairs of electrodes consisting of titanium strips which had been coated with platinum were inserted in a 2 liter Ace reaction vessel having an inside diameter of 4 inches. The electrode strips were 40 mm. wide, 400 mm. in length and about 0.254 mm. thick. The electrodes were mounted in a movable support by which they could be raised or lowered along the inside pehiphery of the reaction vessel to provide means for controlling the surface area of the electrodes within the reaction vessel. The electrodes were connected to an adjustable laboratory direct current power supply having a maximum continuous output of 250 amperes at about 60 volts. The reactor was also provided with agitation means which consisted of a stirring impeller centrally located in the reaction vessel. The reaction vessel was also equipped with temperature controlling means which consisted of an external cooling jacket and an immersion heater, the latter being controlled by a temperature sensitive capacitance relay.

To the reaction vessel there was added 60 grams (approximately 1 gram mol) of N-propyl alcohol and 1500 ml. of an aqueous solution containing 20% by weight of NaCl. The five pairs of electrodes were immersed in the propyl alcohol-NaCl solution in the reaction vessel to a depth of 8 centimeters to provide an electrode contact surface of 640 square centimeters. The reaction vessel was maintained at a temperature of 2±1° C. by means of Dry Ice and trichloroethylene which were placed in the cooling jacket. The electric current was adjusted so that there was a potential of 5.5 volts between the electrodes and a current of 110 amperes of direct electric current flowed through the aqueous medium to provide a current density of 0.343 amperes per square centimeter (318 amperes/sq. ft) of electrode contact surface. Therefore and while agitation was continued there was slowly added to the reaction vessel over a 60 minute period 85 ml. of concentrated hydrochloric acid (about 1 gram mol of HCl). The rate of addition was such as to maintain the pH of the medium at between 8 and 9. During the addition of the hydrochloric acid to the reaction vessel N-propyl hypochlorite formed as an insoluble liquid dispersed in the liquid medium of the reaction vessel. The N-propyl hypochlorite formation was accompanied by the evolution of hydrogen gas from the medium. After the hydrochloric acid was added the passage of electric current through the medium was stopped and the pH adjusted to about 7.1 after which agitation was stopped. Clear liquid N-propyl hypochlorite, having a yellowish tinge rose to the top and floated on the surface of the liquid in the reaction vessel. Sixty-seven grams of this material was recovered by decantation and was 71% of the amount theoretically obtainable based on the N-propyl alcohol charged. The available chlorine content of the material, determined by standard iodometric titration was found to be 70% corresponding substantially to the theoretical available chlorine content of N-propyl hypochlorite.

Example II.—The preparation of t-butyl hypochlorite

The procedure of Example I was repeated, except that the alcohol-salt solution initially added to the reaction vessel contained 37 grams (approximately 0.5 gram mol) of t-butyl alcohol instead of the n-propyl alcohol employed in that example. Also the 5 pairs of platinized titanium lectrodes employed in Example I were replaced with 5 pairs of equally spaced electrodes consisting of cylindrical graphite rods having a diameter of 1.0 cm. The rods were immersed in the aqueous medium of the reaction vessel to a depth of 10 centimeters to provide a total electrode surface area of 314 square centimeters. The current was adjusted so that a direct rippled current, rippled at 120 cycles per second by means of alternating current flowed through the aqueous medium. The potential between the electrodes was 5.4 volts and the peak to peak voltage of the ripple was 5.0 volts. A current of 16 amperes flowed through the medium to provide the medium with a current density of 0.1 ampere per square centimeter (92.9 amperes/sq. ft.) of electrode contact surface.

During the slow addition of 42.5 ml. of hydrochloric acid (0.5 gram mol of HCl) t-butyl hypochlorite formed in the aqueous medium in the reaction zone accompanied by the evolution of hydrogen gas therefrom. A clear liquid material which floated to the top of the aqueous medium was recovered as in Example I. The 43 grams obtained were 79% of that theoretically possible based on the t-butyl alcohol charged. The available chlorine content of the material was 64% corresponding to the theoretical available chlorine content of t-butyl hypochlorite.

Example III.—The preparation of N-chloromethylamine

The reaction vessel of Example I was employed except that 1 pair of platinium electrodes 5 cm. wide and 20 cm. long were mounted ¼ inch apart and used in place of the electrodes of that example. The platinum electrodes were immersed to a depth of 10 cm. in 1500 ml. of an 18% by weight aqueous potassium chloride solution to which had been added 10.8 grams of an aqueous solution containing 29% by weight of methylamine. The solution was maintained at a temperature of 5° C. The electrodes were connected to a power supply adjusted to provide a rippled DC voltage of 4.9 volts and a peak to peak 120 cycle ripple of 4.7 volts. A direct current of 7 amperes was flowing through the medium between the electrodes and the current density was 0.14 ampere per sq. cm. (130 amperes per sq. ft.) of electrode surface. There was then immediately added, with agitation, over a 65 minute period 21 ml. of 5 normal hydrochloric acid. This rate of addition was such that the pH of the medium was maintained at pH 7, ±0.5.

During the reaction N-chloromethyl amine formed in the reatcion vessel accompanied by the elevution of hydrogen gas. The N-chloromethyl amine was recovered from the solution by extraction with five 150 ml. portions of methylene chloride. The solution containing N-chloro- methyl amine in methylene chloride was analyzed by ultraviolet spectroscopy and found to contain 4 grams of N-chloromethyl amine representing a yield of 61% of that theoretically possible, based on the methylamine charged.

Example IV.—The preparation of p-toluene N-chlorosulfonamide (Chloramine T)

To the reaction vessel of Example I containing the electrodes employed in that example there was added 1700 ml. of a 25 weight percent aqueous solution of NaCl. The electrodes were lowered in the medium to maintain the same electrode contact surface area as in that example. The electric power source to which the electrodes were connected was adjusted to provide a direct current of 50 amperes at 4.3 volts. The density of the current between the electrodes was 145 amperes per sq. ft. The contents of the reaction vessel were cooled and maintained at 5° C. To the reaction vessel over an 80 minute period there was charged with continued agitation 171 grams (1 gram mol) of dry p-toluene sulfonamide and 58.5 grams (1 gram mol) of NaCl. During the addition of the last mentioned reactants and while the current was flowing through the reaction vessel p-toluene N-chlorosulfonamide formed in and precipitated from the liquid in the reaction vessel. At the end of the period the current was turned off and the contents were removed from the reaction vessel. The precipitate was recovered by filtration and dried. 204 grams of a white material which upon analysis was found to consist of substantially pure sodium p-toluene N-chlorosulfonamide was obtained. The yield was 94% of that theoretically possible based on the p-toluene sulfonamide charged.

Example V.—The preparation of N,N-dichloro-5,5-dimethyl hydantoin

The reaction vessel of Example I was provided with 1 pair of electrodes consisting of 2 strips 5 cm. by 20 cm. of tantalum having a coating of platinum on the surface thereof and mounted ⅛ inch apart. To the reaction vessel there was charged 1,500 ml. of a 23 weight percent soluble of NaCl to which had been added 100 grams of 5,5-dimethyl hydantoin. The electrodes were immersed in the aqueous solution to a depth of 13 cm. The contents of the reaction vessel were vigorously stirred and maintained at a temperature between 15° and 20° C. The electrodes were connected to an adjustable power supply which was adjusted to provide a direct electric current of 40 amperes through the reaction zone liquid and a potential of 4.9 volts between the electrodes. The current density was 0.62 ampere per sq. cm. (575 amperes per sq. ft.). There was slowly added over a 1 hour and 40 minute period 1.6 mols of HCl in the form of concentrated hydrochloric acid. The hydrochloric acid was added at a rate such that the pH of the medium in the reaction zone was maintained between 4 and 5.

During the addition of the hydrochloric acid, N,N'-dichloro-5,5-dimethyl hydantoin formed as a precipitate in the aqueous medium in the reaction vessel. After the reaction was complete the contents of the reaction vessel were removed, cooled and the precipitate recovered by filtration. After drying, a total of 140 grams of material which upon available chlorine and X-ray diffraction analysis proved to be substantially pure N,N'-dichloro-5,5-dimethyl hydantoin was obtained. The yield corresponded to 91% of that theoretically obtainable based on the 5,5-dimethyl hydantoin charged. N-N'-di-iodo-5,5-dimethyl hydantoin was prepared by substituting sodium iodide for sodium chloride and aqueous HI for the hydrochloric acid employed in the above example.

Example VI.—The preparation of trichlorocyanuric acid

Ten liters of a 22 weight percent aqueous solution of sodium chloride was placed in a 16 liter reaction vessel connected to a pump and equipped with a stirrer, pH electrodes, and a cooling jacket. The solution was maintained at a temperature of 20° C. and was pumped at a rapid rate through a bi-polar electrolysis cell. The bi-polar electrolysis cell consisted of 10 parallel plates of commercially supplied platinized titanium electrode material. Each plate had a dimension 1½″ by 10″ and was supported along the 2 longer sides by nonconductive grooved plastic supports in which the plates were embedded at ¼ inch intervals. Each plate was extended on each free side by a 1½ inch wide nonconducting separator material attached in parallel fashion to the plastic supports. The direction of flow of the liquid through the cell was lengthwise through the plates and after passing through the plates the liquid was returned to the original 16 liter container and recycled through the electrolysis cell. The 2 plates at each end of the parallel array were connected to an adjustable power source which was adjusted so as to supply 54 volts between the 2 outside plates and a direct current flow of 100 amperes to flow through the cell. The density of the electric current through the electric medium was 960 amperes per square foot of electrode surface. There was then added over a 2 hour period at the rate of 8.55 grams per minute 1,025 grams (7.95 mols) of cyanuric acid. Concentrated hydrochloric acid was also added at a rate such that the pH of the liquid was between 3.0 and 3.5. At the end of the reaction 24.8 mols of HCl had been charged. During the 2 hour period a white solid formed in the liquid and partially settled in the 16 liter reaction vessel. At the conclusion of the run the solids were separated by filtration, analyzed and found to consist of 1,720 grams of substantially pure trichlorocyanuric acid. The filtrate was analyzed and found to contain an additional 100 grams of trichlorocyanuric acid. The total yield of trichlorocyanuric acid formed amounted to 98% of that theoretically possible based on the cyanuric acid charged. During the passage of the liquid through the cell hydrogen gas was evolved in the cell and was removed therefrom and collected. Trichlorocyanuric acid was also prepared using the apparatus above described by replacing the sodium chloride and cyanuric acid with trisodium cyanurate and adding hydrochloric acid at a rate sufficient to maintain the pH of the medium between 3.0 and 3.5.

Example VII.—The preparation of dichlorocyanuric acid

Two thousand ml. of an aqueous solution containing 24 weight percent of sodium chloride were placed in a vessel connected to a pump and equipped with a cooling jacket, pH electrodes and a stirrer. This solution was maintained at a temperature of 20° C. and was continuously pumped through an electrolysis cell consisting of two commercial electrodes of linseed oil treated graphite. Each electrode had an area of 46 square inches. The electrodes were mounted in parallel ¼ inch apart by means of a water tight nonconductive plastic gasket. The electrolysis cell was equipped with a vent for the removal of hydrogen gas. The graphite plates were connected to an adjustable power supply which was adjusted to provide a 60 cycle direct rippled electric current of 25 amperes through the aqueous medium, a voltage of 4.1 volts and a peak to peak ripple of 4.1 volts between the electrodes. The current density was 0.084 amperes per square centimeter (78 amperes per sq. foot).

There was added to the vessel over a 125 minute period end at the rate of 2.0 grams every 5 minutes a total of 50 grams (0.39 mol) cyanuric acid. Simultaneously during this period there was added to the vessel 0.78 mol of HCl in the form of hydrochloric acid at a rate such as to maintain the pH of the aqueous medium between 3.0 and 4.0. During the operation solid dichlorocyanuric acid formed in the aqueous medium and settled to the bottom of the vessel. After 125 minutes the current was discontinued and 67 grams of substantially pure dichlorocyanuric acid was recovered from the aqueous medium by filtration. Analysis of the filtrate showed that it contained an additional 9 grams of dissolved dichlorocyanuric acid. The total product yield was 99% of that theoretically obtainable based on the cyanuric acid charged.

Example VIII.—The preparation of calcium di(dichlorocyanurate)

Four thousand ml. of a 30 weight percent aqueous solution of calcium chloride were charged to a vessel connected to a pump and equipped with pH electrodes and a cooling jacket and cooled to 20° C. This solution was continuously pumped and cycled through an electrolysis cell consisting of two commercial platinized titanium electrode plates mounted in parallel ¼ inch apart and vented for the removal of hydrogen gas. Each electrode plate was rectangular in shape and had an area of 46 square inches. The electrodes were connected to an adjustable electric power source adjusted to supply a flow of 160 amperes of rippled electric current through the solution in the electrolysis cell. The voltage was 6.0 volts and the peak to peak ripple voltage was 0.8 volt. The current density was 500 amperes per sq. ft. There was continuously added to the reaction vessel 2.7 grams per mintue of cyanuric acid and 2.3 grams per minute of $CaCl_2 \cdot 6H_2O$ for 148 minutes. During this period the pH of the medium was maintained at 7.0 by adding sufficient hydrochloric acid to the medium. During the operation solid calcium di(dichlorocyanurate) formed and settled from the aqueous medium. After 148 minutes, 3.1 moles of HCl had been added. The electric current was discontinued and the contents removed from the reaction system and filtered. After drying the material 620 grams of substantially pure calcium di(dichlorocyanurate) was obtained. The filtrate contained a further 40 grams. The yield was substantially 100% of that theoretically possible, based on the cyanurate charged.

The above procedure was repeated except that an alternating 60 cycle electric current was employed. At the end of the process substantially pure calcium di(dichlorocyanurate) was obtained in a yield of about 15% of that theoretically possible, based on the cyanurate charged.

Example IX.—The preparation of potassium dichlorocyanurate

To the vessel of Example VIII there was charged 4,000 ml. of a solution containing 23% by weight of KCl. This solution was continuously cycled by pumping through an electrolysis cell such as described in Example VIII, except that the electric power source to which the electrodes were connected was adjusted to provide a current flow of 300 amperes of rippled electric current at 6.2 volts between the electrode plates. The current density was 930 amperes per square foot. There was charged, over a 180 minute period, 5.6 grams per minute of dry cyanuric acid, 3.25 grams per minute of dry potassium chloride and hydrochloric acid at a rate sufficient to maintain the pH of the medium between 7 and 8. After 180 minutes 1,000 grams of cyanuric acid and 8 mols of hydrochloric acid has been charged. During the period of operation the liquid was maintained at 20° C. As the aqueous medium was cycled hydrated potassium dichlorocyanurate formed in the aqueous medium and settled to the bottom of the reaction vessel. After the operation was completed the liquid slurry was removed from the system, cooled to 15° C. and filtered. Upon filtering the liquid the solids after drying consisted of 1,730 grams of pure potassium dichlorocyanurate. The filtrate was analyzed and found to contain 1.8% additional potassium dichlorocyanurate. The total yield of potassium dichlorocyanurate was 99.8% of that theoretically possible based on the cyanuric acid charged.

Example X.—The preparation of potassium dichlorocyanurate

Ten liters of 23 weight percent aqueous solution of potassium chloride were charged to vessel of Example VI. This material was pumped through a bi-polar cell such as described in Example VI. However, the cell of that example had been modified in that 10 plates of platinum 1½" by 12" were substituted for the platinized titanium of Example VI. The two outer plates of the cell were connected to an adjustable power source which was adjusted to furnish a rippled direct average current of 19 amperes through the medium in the cell. Thus the rippled current was a direct current having a superimposed alternating current superimposed thereon. The voltage of the direct current was 50 volts and the peak to peak amplitude of the ripple was 48 volts. The current density was 152 amperes per sq. ft. The temperature of the liquid was maintained at a temperature of about 20° C. Over a 140 minute period there was charged to the reaction vessel dry cyanuric acid at the rate of 2.85 grams per minute, dry potassium chloride at the rate of 1.66 grams per minute and concentrated hydrochloric acid at a rate such as to maintain the pH of the liquid between 7 and 8. After 140 minutes of the operation 400 grams of cyanuric acid, 232 grams of KCl and 3.2 mols of HCl had been charged. During the operation a solid hydrate of potassium dichlorocyanurate continuously formed in the liquid in the reaction vessel. At the end of 140 minutes the passage of the current was discontinued and the contents of the reaction vessel which consisted of an aqueous slurry containing solid hydrated potassium dichlorocyanurate were filtered to remove the solids. After drying the solids, 545 grams of potassium dichlorocyanurate were obtained. Analysis of the filtrate showed that it contained an additional 180 grams of potassium dichlorocyanurate. The total amount of potassium dichlorocyanurate formed was 99% of that theoretically possible based on the cyanuric acid charged.

Example XI.—The preparation of potassium dibromocyanurate

Using the apparatus employed in Example VIII, 3 liters of a 35 weight percent aqueous solution of potassium bromide was charged to the reaction vessel and cycled by means of pumping through the electrolysis cell of that example. The adjustable direct current power supply was adjusted so as to send a current of 180 amperes at 4.2 volts through the electrolysis cell. The current density was 555 amperes per sq. ft. The temperature of the liquid in the vessel was maintained at 23° C. during the operation. There was added over an 80 minute period at a constant rate 200 grams of dry cyanuric acid, 185 grams of dry KBr and 1.6 moles of HBr in the form of a 35 weight percent aqueous solution of HBr, which was added at a rate sufficient to maintain the pH of the liquid between about 7 and 8. During the operation solid potassium dibromocyanurate formed in the liquid as a fine white precipitate. After 80 minutes the contents were filtered and the filter cake dried. Upon analysis the filter cake was found to consist of 460 grams of substantially pure potassium dibromocyanurate. The total yield was 95% of that theoretically possible, based on the cyanuric acid charged.

Potassium monobromo monochlorocyanurate was prepared by substituting NaCl for a portion of the NaBr and HCl for the HBr employed in the above example.

What is claimed is:

1. A process which comprises passing an electric current between at least one pair of electrodes through an aqueous medium maintained at a temperature in the range of from just above the freezing point to about 80° C. and a pH in the range of from about 1 to 12 and comprising (1) water, (2) an inorganic halide and (3) an organic compound having preferentially-electro-positive-halogen-replaceable-hydrogen bonded to an atom selected from the group consisting of nitrogen and oxygen atoms to form an organic compound containing positive halogen in the said aqueous medium, said electric current having a current density of from about 50 to about 2,000 amperes per square foot of electrode surface area, said electrodes having from about 1 to about 12 volts potential therebetween, and said first mentioned organic compound being further characterized in not having carbon-carbon unsaturation within its molecule.

2. A process as set forth in claim 1 wherein the temperature of said medium is in the range of from just above the freezing point to 40° C., the pH is in the range of from about 4 to about 10, and the first mentioned organic compound is a saturated alcohol.

3. A process as in claim 1 wherein the electric current is a pulsating current which includes a direct electric current having an alternating current superimposed thereon.

4. A process as in claim 2 wherein the saturated alcohol is propyl alcohol.

5. A process which comprises passing an electric current between at least one pair of electrodes through an aqueous medium maintained at a temperature in the range of from just above the freezing point to about 40° C. and a pH in the range of from about 4 to about 10 and comprising (1) water, (2) an inorganic halide and (3) an organic nitrogen containing compound having preferentially-electro-positive-halogen-replaceable-hydrogen bonded to a nitrogen atom in said compound, which is further characterized in having molecules free of carbon-carbon unsaturation, said electric current having a current density of from about 50 to about 2,000 amperes per square foot of electrode surface area and said electrodes having from about 1 to about 12 volts potential therebetween.

6. A process which comprises passing an electric current between at least one pair of electrodes through an aqueous medium maintained at a temperature in the range of from just above the freezing point to about 40° C. and having a pH in the range of from about 4 to about 10 and comprising (1) water, (2) an inorganic halide and (3) an amine having at least one preferentially-electro-positive-halogen-replaceable-hydrogen bonded to the nitrogen atom of the amine group to form an organic N-halogenated amine in said aqueous medium, said electric current having a current density of from about 50 to about 2,000 amperes per square foot of electrode surface area, said electrodes having from about 1 to about 12 volts potential therebetween, and said first mentioned amine being further characterized in having a molecule free of carbon-carbon unsaturation.

7. A process which comprises passing an electric current between at least one pair of electrodes through an aqueous medium maintained at a temperature of from about 5° C. to about 50° C. and a pH of from about 2.0 to about 12.0 and comprising (1) water, (2) an inorganic halide and (3) a heterocyclic organic compound having in one tautomeric form the following general formula:

where X is selected from the group consisting of

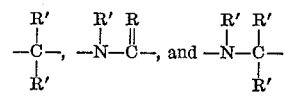

and where R is selected from the group consisting of oxygen and NH and R' is selected from the group consisting of hydrogen and alkyl radicals, to form an N-halogenated heterocyclic organic compound in said aqueous medium, said electric current having a current density of from about 50 to about 2,000 amperes per square foot of electrode surface area, and said electrodes having from about 1 to about 12 volts potential therebetween.

8. A process which comprises passing an electric current between at least one pair of electrodes through an aqueous medium maintained at a temperature of from about 5° C. to about 50° C. and a pH of from about 2 to about 12 and comprising (1) water, (2) an inorganic halide and (3) a cyanurate to form an N-halogenated cyanurate in said aqueous medium, said electric current having a current density of from about 50 to about 2,000 amperes per square foot of electrode surface area, and said electrodes having from about 1 to about 12 volts potential therebetween.

9. A process which comprises passing an electric current between at least one pair of electrodes through an aqueous medium maintained at a temperature in the range of from about 5° C. to about 50° C. and a pH of from about 2 to about 12 and comprising (1) water, (2) an inorganic halide and (3) from about 0.05% to about 60% by weight, based on the weight of the aqueous medium, of cyanuric acid to form an N-halogenated cyanurate in said medium, said electric current having a current density of from about 50 to about 2,000 amperes per square foot of electrode surface area, and said electrodes having from about 1 to about 12 volts potential therebetween.

10. A process as in claim 9 wherein the inorganic halide is a mixture of a hydrohalide and a metal halide containing the same halogen as said hydrohalide.

11. A process of preparing a chlorocyanuric acid which comprises passing an electric current between at least one pair of electrodes through an aqueous medium maintained at a temperature of from about 5° C. to about 50° C. and a pH in the range of from about 2 to about 5 and comprising (1) water, (2) from about 0.1% to about 30% by weight, based on the weight of the aqueous medium, of an inorganic chloride consisting essentially of a mixture of a water soluble metal chloride and hydrochloric acid and (3) from about 0.05% to about 60% by weight, based on the weight of the aqueous medium, of cyanuric acid to form a chlorocyanuric acid, in said medium the amount of hydrochloric acid employed being sufficient to provide a hydrochloric acid to cyanuric acid mol ratio of from about 1.8:1 to about 3.2:1, said electric current having a current density of from about 50 to about 2,000 amperes per square foot of electrode surface area, and said electrodes having from about 1 to about 12 volts potential therebetween.

12. A process of preparing dichlorocyanuric acid which comprises passing an electric current between at least one pair of electrodes through an aqueous medium maintained at a temperature of from about 5° C. to about 50° C. and a pH in the range of from about 2 to about 4.5 and consisting essentially of (1) water, (2) from about 0.1% to about 30% by weight, based on the weight of the aqueous medium of a mixture consisting essentially of a water soluble metal chloride and hydrochloric acid and (3) from about 0.05% to about 60% by weight, based on the weight of the aqueous medium, of cyanuric acid to form dichlorocyanuric acid in said medium, the amount of hydrochloric acid employed being sufficient to provide a mol ratio of hydrochloric acid to cyanuric acid of from about 1.8:1 to 2.2:1, said electric current having a current density of from about 50 to about 2,000 amperes per square foot of electrode surface area, and said electrodes having from about 1 to about 12 volts potential therebetween.

13. A process of preparing trichlorocyanuric acid which comprises passing an electric current between at least one pair of electrodes through an aqueous medium maintained at a temperature of from about 5° C. to about 50° C. and a pH in the range of from about 2 to about 4.5 and consisting essentially of (1) water, (2) from about 0.1% to about 30% by weight, based on the weight of the aqueous medium, of a mixture of a water soluble metal chloride and hydrochloric acid and (3) from about 0.05% to about 60% by weight, based on the weight of the aqueous medium, of cyanuric acid to form trichlorocyanuric acid in said medium, the amount of hydrochloric acid employed being sufficient to provide a mol ratio of hydrochloric acid to cyanuric acid of from about 2.8:1 to 3.2:1, said electric current having a current density of from about 50 to about 2,000 amperes per square foot of electrode surface area, and said electrodes having from about 1 to about 12 volts potential therebetween.

14. A process of preparing a metal dichlorocyanurate which comprises passing an electric current between at least one pair of electrodes through an aqueous medium maintained at a temperature in the range of from about 5° C. to about 50° C. and a pH in the range of from about 5 to about 12 and consisting essentially of (1) water, (2) from about 0.1% to about 30% by weight, based on the weight of the aqueous medium, of a mixture consisting of a water soluble metal chloride and hydrochloric acid and (3) from about 0.1% to about 60% by weight, based on the weight of the aqueous medium, of a cyanurate; the amount of hydrochloric acid employed being sufficient to provide a mol ratio of hydrochloric acid to cyanurate of from about 0.8:1 to 3.2:1, said electric current having a current density of from about 50 to about 2,000 amperes per square foot of electrode surface area, and said electrodes having from about 1 to about 12 volts potential therebetween.

15. A process for preparing an alkaline earth metal dichlorocyanurate which comprises passing a direct electric current between at least one pair of electrodes through an aqueous medium maintained at a temperature of from about 5° C. to about 50° C. and a pH in the range of from about 5 to about 12 and consisting essentially of (1) water, (2) from about 0.1 to about 30% by weight, based on the weight of the aqueous medium, of a mixture consisting essentially of an alkaline earth metal chloride and hydrochloric acid and (3) from about 0.1% to about 60% by weight, based on the weight of the aqueous medium, of cyanuric acid to form an alkaline earth metal dichlorocyanurate in said aqueous medium, the amount of said hydrochloric acid being sufficient to provide a mol ratio of hydrochloric acid to cyanuric acid of from about 0.8:1 to 1.2:1, said electric current having a current density of from about 50 to about 2,000 amperes per square foot of electrode surface area, and said electrodes having from about 1 to about 12 volts potential therebetween.

16. A process for preparing calcium di(dichlorocyanurate) which comprises passing a direct electric current between at least one pair of electrodes through an aqueous medium maintained at a temperature in the range of from about 5° C. to about 50° C. and a pH in the range of from about 5.0 to about 8.5 and consisting essentially of (1) water, (2) from about 10% to about 25% by weight, based on the weight of the aqueous medium, of a mixture of calcium chloride and hydrochloric acid and (3) from about 5% to about 50% by weight, based on the weight of the aqueous medium, of cyanuric acid to form calcium di(dichlorocyanurate), the amount of said hydrochloric acid being sufficient to provide a mol ratio of hydrochloric acid to cyanuric acid of from about 0.8:1 to about 1.2:1, said electric current having a current density of from about 50 to about 2,000 amperes per square foot of electrode surface area, and said electrodes having from about 1 to about 12 volts potential therebetween.

17. A process for preparing an alkali metal dichlorocyanurate which comprises passing a direct electric current between at least one pair of electrodes through an aqueous medium maintained at a temperature of from about 5° C. to about 50° C. and a pH in the range of from about 5 to about 12 and consisting essentially of (1) water, (2) from about 0.1 to about 30% by weight, based on the weight of the aqueous medium, of a mixture consisting essentially of an alkali metal chloride and hydrochloric acid and (3) from about 0.1% to about 60% by weight, based on the weight of the aqueous medium, of cyanuric acid to form an alkali metal dichlorocyanurate in said medium, the amount of hydrochloric acid employed being sufficient to provide a mol ratio of hydrochloric acid to cyanuric acid of from about 0.8:1 to about 1.2:1, said electric current having a current density of from about 50 to about 2,000 amperes per square foot of electrode surface area, and said electrodes having from about 1 to about 12 volts potential therebetween.

18. A process for preparing potassium dichlorocyanurate which comprises passing a direct electric current between at least one pair of electrodes through an aqueous medium maintained at a temperature of from about 5° C. to about 50° C. and a pH in the range of from about 5.5 to about 8.5 and comprising (1) water, (2) from about 10% to about 25% by weight, based on the weight of the aqueous medium, of a mixture of potassium chloride and hydrochloric acid and (3) from about 5% to about 50% by weight, based on the weight of said medium, of cyanuric acid to form potassium dichlorocyanurate in said aqueous medium; the amount of hydrochloric acid used being sufficient to provide a mol ratio of HCl to cyanuric acid of from about 0.8:1 to about 1.2:1, said electric current having a current density of from about 50 to about 2,000 amperes per square foot of electrode surface area, and said electrodes having from about 1 to about 12 volts potential therebetween.

19. A continuous process for preparing potassium dichlorocyanurate which comprises the steps of (1) continuously introducing an aqueous medium, maintained at a temperature in the range of from about 0° C. to about 40° C. and comprising water, from about 0.1% to about 50% by weight of cyanuric acid and from about 5% to about 25% by weight of potassium chloride, into a bipolar electrolysis cell containing multiple metallic electrodes, (2) contacting said aqueous medium with said electrodes and continuously passing a direct electric current having a density of from about 100 to about 2,000 amperes per square foot of electrode surface at a total potential of from about 1.5 to about 300 volts between the electrodes through said aqueous medium, (3) continuously, and simltaneously with the passage of said electric current, adding an aqueous solution of hydrochloric acid to said medium at a concentration and at a rate sufficient to provide and maintain a pH in the range of about 5.5 to about 8.5 in said aqueous medium while maintaining the temperature of the medium within said range, thereby continuously forming an aqueous slurry containing solid potassium dichlorocyanurate dispersed in the aqueous phase of said medium, continuously removing the slurry so formed and separating the potassium dichlorocyanurate from the bulk of the aqueous phase of the slurry thus removed.

References Cited

UNITED STATES PATENTS 914,251   3/1909   Ellis et al. _____ 204—81

FOREIGN PATENTS 1,016,485   1/1966   Great Britain.

OTHER REFERENCES

Leininger et al.: The Electrochemical Society (Preprint 88–31), vol. 88, 1945, pp. 73 to 76.

JOHN H. MACK, *Primary Examiner.*

H. M. FLOURNOY, *Assistant Examiner.*